United States Patent Office 3,393,236
Patented July 16, 1968

3,393,236
STEREOISOMERIC PREPARATION OF BIS(p-AMINOCYCLOHEXYL)METHANE
James R. Kuszewski, Wilmington, Del., assignor to E. I. du Pont de Nemours and Company, Wilmington, Del., a corporation of Delaware
No Drawing. Filed June 9, 1965, Ser. No. 462,730
4 Claims. (Cl. 260—563)

This invention relates to methods of isolating the trans,trans-stereoisomer of bis(p-aminocyclohexyl)methane. More particularly it is directed to methods of isolating the trans,trans-stereoisomer from a mixture of the stereoisomers of bis(p-aminocyclohexyl)methane by preferential recovery of the trans,trans-isomer from the mixed isomers and 2-propanol, 2-butanol, or 2-pentanol.

Bis(p-aminocyclohexyl)methane, hereinafter referred to as PACM, is known to exist in three stereoisomeric forms. These stereoisomers exist because of the relative configuration of the two pendant amine groups and the methylene group bridging the two cyclohexyl moieties. The three stereoisomers are designated by common terminology the cis,cis-, the cis,trans- and the trans,trans-isomers.

As is often true of stereoisomers, the PACM isomers differ in some physical properties such as melting points. In order to obtain a particularly desired property it is often necessary to separate the stereoisomers or at least to concentrate one or more isomers at the expense of the concentration of the other isomers or isomer.

Various techniques are known for isolating or enriching the stereoisomers of PACM. Kirk et al., U.S. Patent No. 2,494,563, describes several techniques such as crystallization from solvents, preparation and isolation of derivatives and fractional crystallization in the absence of a solvent. Arthur, U.S. Patent No. 3,153,088, describes another technique, which is formation and recovery of the hydrate.

The formation of chemical derivatives which gives a positive crystallization scheme has the disadvantage of usually requiring at least one reaction step and one or more subsequent chemical steps to regenerate the diamine after separation. Direct crystallization, with or without a solvent, has been considered disadvantageous in that the solubility of the three isomers is similar and crystallization is often difficult to achieve. A high degree of concentration of one isomer could therefore require many recrystallizations.

I have discovered that the trans,trans-isomer of PACM can be crystallized directly using 2-propanol, 2-butanol or 2-pentanol. Such a discovery permits for inexpensive and convenient one-step recovery of the trans,trans-isomer in outstanding yields. Moreover, the high recoveries can be obtained at room temperatures, removing the necessity for costly cooling equipment which is required for other crystallization mediums such as hexane, which necessitates low-temperature crystal recovery.

Even more surprising is the excellent recovery and high yields of the trans,trans-isomer of PACM with 2-propanol, 2-butanol or 2-pentanol in view of the marked difficulty encountered in recrystallizing and separating PACM isomer mixtures from other 3, 4 or 5 carbon acyclic alcohols.

STARTING MATERIALS

The PACM starting material suitable for use in this invention can be prepared by any conventional means. Satisfactory methods are described, for example, in Kirk et al., U.S. Patent No. 2,994,563 issued Jan. 17, 1950; Whitman, U.S. Patent No. 2,606,925 issued Aug. 12, 1952; and Barkdoll et al., U.S. Patent No. 2,606,928 issued Aug. 12, 1952.

The alcohols suitable for use in this invention, 2-propanol, 2-butanol and 2-pentanol, can be obtained commercially or can be prepared by methods well known in the art.

If desired the thiol analogs of these alcohols can be used in the processes of this invention for the recovery of the trans,trans-isomer of PACM. 2-propanethiol, 2-butanethiol, or 2-pentanethiol are satisfactory mediums for preferential recovery of the trans,trans-isomer.

The alcohols, however, are the preferred medium for crystallization because they are highly effective in separation of the trans,trans-isomer, and 2-propanol is particularly preferred because it gives the most efficient separation and highest yield of the trans,trans-isomer.

It is desirable that the starting materials be as dry as is practical and preferably they should be essentially anhydrous.

SEPARATION CONDITIONS

Isolation and recovery of the trans,trans-stereoisomer of PACM from the 2-propanol, 2-butanol or 2-pentanol can be accomplished by conventional means.

Most simply the PACM mixed isomers can be admixed with, for example, 2-propanol and the mixture can be heated as necessary to effect complete solution. Upon cooling to about 25° C., or lower, the solid recrystallized product can be recovered by filtration.

Separation of the crystallized product can, of course, be accomplished by any other suitable means such as centrifugation or continuous counter-current crystal purification.

Alternative isolation procedures include spraying molten PACM into pre-cooled 2-propanol, 2-butanol or 2-pentanol. When addition of the PACM is complete, the crystallized product, rich in trans,trans-isomer, is recovered such as by filtration.

If desired, very finely divided solid PACM can be washed with 2-propanol, 2-butanol, or 2-pentanol to obtain an enriched trans,trans-isomer product.

Care should be taken during the separation and recovery to exclude moisture from the components. It is preferred to conduct the separation and recovery under essentially anhydrous conditions.

Weight ratios of alcohol to PACM can range generally from about .5:1 to 7:1. Although higher or lower ratios can be used they tend to reduce the outstanding recoveries obtainable with the processes of this invention.

Normally, weight ratios of alcohol to PACM of about 1:1 to 4:1 are preferred when recovery is to be made at room temperature. Similarly, ratios of about 2:1 to 5:1 are preferred if recoveries are to be made at lower temperatures such as 0° C.

As this indicates, isolation and recovery temperatures are to some degree related to the concentration of PACM in alcohol. Generally speaking, temperatures of from about −25° C. to 25° C. are most convenient. Particularly preferred temperatures are 20 to 25° C. because recovery can be had at such temperatures without ncessitating cooling the components. Temperatures of −5 to 5° C. are also preferred because at lower ratios of PACM to alcohol more efficient recovery can be had at such temperatures.

The above examples as well as those that follow are for the purpose of exemplifying this invention and should not be construed as in any way limiting the invention. The parts and percentages are by weight unless otherwise noted.

Example 1

To 200 parts of 2-propanol at 25° C. is added a total of 250 parts of PACM which is in liquid form at about 50° C., the isomer distribution of the PACM, by analysis, being 50% trans,trans, 40% cis,trans, and about 10% cis,cis. The resulting mixture is warmed to 30° C. to effect complete solution, and is then cooled to 25° C., whereupon the solid product is collected by filtration. The wet filter cake is washed with 100 parts fresh 2-propanol and dried under vacuum. The dried product comprises 117 parts of PACM isomers which are shown by analysis to contain 83.0% trans,trans-isomer, 14.8% cis,trans-isomer, and 2.2% cic,cis-isomer. Thus a 77.6% recovery of the trans,trans-isomer is obtained.

Example 2

This example is performed in the same manner as Example 1 except that 160 parts of 2-butanol are substituted for the 2-propanol in Example 1. The starting PACM has the same isomer distribution as in Example 1 and the product PACM recovered contains 78.7% trans,trans-isomer, 18.3% cis,trans-isomer, and 3.0% cis,cis-isomer. A total of 103 parts of product is recovered representing a 65% recovery of the trans,trans-isomer.

Example 3

This example is carried out in the same manner as Example 1, except that 160 parts of 2-pentanol are substituted for the 2-propanol of Example 1. The starting PACM has the same isomer distribution as in Example 1. The 112 parts of product which are recovered assay 66.4% trans,trans-isomer, 26.5% cis,trans-isomer, and 6.1% cis,cis-isomer.

Example 4

Six hundred parts of 2-propanol are mixed with 150 parts of PACM, containing 54.5% trans,trans-isomer, 38.5% cis,trans-isomer and 7% cis,cis-isomer. The mixture is warmed to effect complete solution. The solution is then cooled to $-3°$ C. and is filtered, and the product is air dried. Analysis of the product shows an isomer content of 87.7% trans,trans, 10.5% cis,trans, and 1.8% cis,cis. The filtrate contains 19.1% trans,trans, 63.2% cis,trans, 15.3% cis,cis-isomer and the balance other impurities. The recovery of the trans,trans-isomer in the crystallized product is 79.5%.

Example 5

Example 4 is repeated substituting 480 parts of 2-butanol for the 2-propanol of Example 4. Recovery of a substantially equivalent product in similar yield is obtained.

Example 6

Example 4 is repeated substituting 480 parts of 2-pentanol for the 2-propanol of Example 4. A similar product is recovered in similar yield to that of Example 4.

Example 7

A vessel equipped for refrigerating is charged with 500 parts of 2-propanol and the temperature is adjusted to 25° C., which temperature is held throughout the run. To this solvent is slowly added through a spray nozzle a total of 250 parts of a liquid PACM whose isomer content is 54% trans,trans, 38% cis,trans, and 8% cis,cis, the contents of the vessel being stirred throughout the addition. When addition is complete the PACM product, rich in trans,trans-isomer, is recovered by filtration.

Example 8

A mixture of 700 parts of 2-propanol and 100 parts of a PACM having the same isomer distribution as the starting material of Example 7 is warmed to effect complete solution. The solution is then cooled to $-20°$ C. and filtered. The solid product which is recovered is shown by analysis to contain 84.9% trans,trans-isomer, 12.6% cis,trans-isomer, and 2.5% cis,cis-isomer.

I claim:
1. The method of isolating the trans,trans-stereoisomer from a mixture of the stereoisomers of bis(p-aminocyclohexyl)methane by recovery of the trans,trans-isomer from the mixed isomers in admixture with 2-propanol, 2-butanol or 2-pentanol, the weight ratio of alcohol to mixed isomer ranging between about 0.5:1 and about 7:1.
2. The method of isolating the trans,trans-stereoisomer from a mixture of the stereoisomers of bis(p-aminocyclohexyl)methane by crystallization and recovery of the crystals from the mixed isomers in admixture with 2-propanol, 2-butanol or 2-pentanol, the weight ratio of alcohol to mixed isomer ranging between about 0.5:1 and about 7:1.
3. The method of claim 1 in which the alcohol used is 2-propanol.
4. The method of claim 2 in which the alcohol used is 2-propanol.

References Cited
UNITED STATES PATENTS

| | | | |
|---|---|---|---|
| 2,494,563 | 1/1950 | Kirk et al. | 260—563 |
| 2,606,924 | 8/1952 | Whitman | 260—563 |

CHARLES B. PARKER, *Primary Examiner.*

JOSEPH P. BRUST, *Examiner.*

P. C. IVES, *Assistant Examiner.*